United States Patent
Klaassen et al.

(12)

(10) Patent No.: US 11,480,548 B2
(45) Date of Patent: Oct. 25, 2022

(54) ACOUSTIC INSPECTION DEVICE AND METHOD OF OPERATION

(71) Applicant: General Electric Company, Schenectady, NY (US)

(72) Inventors: Richard Eugene Klaassen, West Chester, OH (US); Mark Partika, Blanchester, OH (US)

(73) Assignee: General Electric Company, Schenectady, NY (US)

( * ) Notice: Subject to any disclaimer, the term of this patent is extended or adjusted under 35 U.S.C. 154(b) by 120 days.

(21) Appl. No.: 16/807,321

(22) Filed: Mar. 3, 2020

(65) Prior Publication Data
US 2020/0292503 A1  Sep. 17, 2020

Related U.S. Application Data

(60) Provisional application No. 62/818,229, filed on Mar. 14, 2019.

(51) Int. Cl.
*G01N 29/04* (2006.01)
*G01N 29/24* (2006.01)
(Continued)

(52) U.S. Cl.
CPC ......... *G01N 29/226* (2013.01); *G01N 29/041* (2013.01); *G01N 29/24* (2013.01);
(Continued)

(58) Field of Classification Search
CPC .... G01N 29/226; G01N 29/24; G01N 29/041; G01N 29/0654; G01N 29/043;
(Continued)

(56) References Cited

U.S. PATENT DOCUMENTS 4,213,183 A * 7/1980 Barron ................ G01N 29/226
702/39
4,350,883 A   9/1982 Lagarde
(Continued)

FOREIGN PATENT DOCUMENTS

CN        108169331 A     6/2018
WO    WO2016/109111 A1   7/2016

OTHER PUBLICATIONS

European Search Report Corresponding to Application No. 20161705 dated Jul. 24, 2020.
(Continued)

*Primary Examiner* — Jacques M Saint Surin
(74) *Attorney, Agent, or Firm* — Fitch, Even, Tabin & Flannery LLP

(57) ABSTRACT

An acoustic inspection device and an associated method for inspecting a component are provided. The acoustic inspection device is portable and includes an acoustic transmitter and receiver that may be placed on opposite sides of an inspection region on the surface of the component. The acoustic transmitter has an array of acoustic transducers for generating an acoustic wave that travels along a surface of the component and the acoustic receiver has an array of acoustic transducers for receiving that acoustic wave. A controller determines at least one surface characteristic of the component from the measured acoustic wave, such as its crystalline structure or grain size.

19 Claims, 3 Drawing Sheets

(51) Int. Cl.
*G01N 29/265* (2006.01)
*G01N 29/22* (2006.01)

(52) U.S. Cl.
CPC ... *G01N 29/265* (2013.01); *G01N 2291/0234* (2013.01); *G01N 2291/0289* (2013.01); *G01N 2291/106* (2013.01); *G01N 2291/263* (2013.01)

(58) Field of Classification Search
CPC ............. G01N 29/0645; G01N 29/262; G01N 29/265; G01N 2291/048; G01N 2291/263; G01N 2291/0234; G01N 2291/106; G01N 2291/0289; G01N 2291/102
USPC ........................................................ 73/618
See application file for complete search history.

(56) References Cited

U.S. PATENT DOCUMENTS

| | | | |
|---|---|---|---|
| 4,372,163 A * | 2/1983 | Tittmann | G01N 29/348 |
| | | | 73/602 |
| 4,401,477 A | 8/1983 | Clauer et al. | |
| 4,806,740 A | 2/1989 | Gold et al. | |
| 5,313,193 A | 5/1994 | Dubois et al. | |
| 5,546,462 A | 8/1996 | Indeck et al. | |
| 5,974,889 A | 11/1999 | Trantow | |
| 6,332,361 B1 * | 12/2001 | Yamada | G01N 29/11 |
| | | | 73/627 |
| 6,337,122 B1 | 1/2002 | Grigg et al. | |
| 6,640,632 B1 | 11/2003 | Hatanaka et al. | |
| 6,850,592 B2 | 2/2005 | Schramm et al. | |
| 6,923,065 B2 * | 8/2005 | Smith | G01N 29/07 |
| | | | 73/602 |
| 6,976,627 B1 | 12/2005 | Culp et al. | |
| 7,148,448 B2 | 12/2006 | Warren, Jr. et al. | |
| 7,199,367 B2 | 4/2007 | Favro et al. | |
| 7,217,102 B2 | 5/2007 | Rockstroh et al. | |
| 7,231,826 B2 * | 6/2007 | Bossi | G01N 29/225 |
| | | | 73/618 |
| 7,250,864 B2 | 7/2007 | Murofushi et al. | |
| 7,546,769 B2 * | 6/2009 | Ramaswamy | G01N 3/56 |
| | | | 73/579 |
| 7,584,833 B2 | 9/2009 | Howells | |
| 7,602,963 B2 | 10/2009 | Nightingale et al. | |
| 7,703,327 B2 * | 4/2010 | Georgeson | G01N 29/221 |
| | | | 73/624 |
| 7,851,758 B1 * | 12/2010 | Scanlon | G01J 5/0896 |
| | | | 250/330 |
| 8,222,567 B2 | 7/2012 | Mathai et al. | |
| 8,242,445 B1 * | 8/2012 | Scanlon | G01J 5/0275 |
| | | | 250/330 |
| 8,532,940 B2 * | 9/2013 | Yan | G01N 29/2456 |
| | | | 702/36 |
| 8,536,860 B2 | 9/2013 | Boenisch | |
| 8,837,672 B2 | 9/2014 | Nance et al. | |
| 8,935,286 B1 | 1/2015 | Westerman, Jr. et al. | |
| 8,973,829 B2 | 3/2015 | Atkinson et al. | |
| 8,985,471 B2 | 3/2015 | Freeman | |
| 9,036,916 B2 | 5/2015 | Le | |
| 9,074,927 B2 | 7/2015 | Singh et al. | |
| 9,250,183 B2 | 2/2016 | Smith et al. | |
| 9,311,652 B2 | 4/2016 | Farn et al. | |
| 9,360,589 B1 | 6/2016 | Meinhold et al. | |
| 9,400,910 B2 | 7/2016 | Kumar et al. | |
| 9,414,891 B2 | 8/2016 | Kieser | |
| 9,424,503 B2 | 8/2016 | Kieser | |
| 9,689,844 B2 * | 6/2017 | Holmes | G01N 29/2468 |
| 2001/0035050 A1 * | 11/2001 | Kenney | G01N 29/11 |
| | | | 73/579 |
| 2002/0126889 A1 | 9/2002 | Pikler et al. | |
| 2007/0044559 A1 * | 3/2007 | Andrews | G01N 33/383 |
| | | | 73/584 |
| 2008/0159529 A1 | 7/2008 | Aarts et al. | |
| 2009/0168074 A1 | 7/2009 | Monchalin et al. | |
| 2009/0286007 A1 | 11/2009 | Brancher | |
| 2010/0061619 A1 | 3/2010 | Boegli | |
| 2011/0303885 A1 | 12/2011 | Vanheusden et al. | |
| 2013/0193214 A1 | 8/2013 | Margulis et al. | |
| 2014/0205083 A1 | 7/2014 | Pryakhin et al. | |
| 2014/0263674 A1 | 9/2014 | Cerveny | |
| 2015/0147585 A1 | 5/2015 | Schwarze et al. | |
| 2015/0308337 A1 | 10/2015 | Marasco et al. | |
| 2015/0308982 A1 * | 10/2015 | Perrin | G01N 29/4418 |
| | | | 73/588 |
| 2015/0324677 A1 | 11/2015 | Talyansky et al. | |
| 2016/0107764 A1 | 4/2016 | O'Kell et al. | |
| 2016/0207345 A1 | 7/2016 | Farmer et al. | |
| 2016/0253586 A1 | 9/2016 | Cook et al. | |
| 2016/0260001 A1 | 9/2016 | Flores et al. | |
| 2016/0283834 A1 | 9/2016 | Bobbitt, III | |
| 2016/0298268 A1 | 10/2016 | Gallucci et al. | |
| 2016/0306088 A1 | 10/2016 | Ouderkirk et al. | |
| 2016/0307083 A1 | 10/2016 | Kumar et al. | |
| 2016/0311164 A1 | 10/2016 | Miyano | |
| 2017/0120338 A1 | 5/2017 | Goeing et al. | |
| 2017/0232779 A1 | 8/2017 | Viens et al. | |
| 2017/0284972 A1 | 10/2017 | Lepage et al. | |
| 2018/0067085 A1 * | 3/2018 | Ininger | G01N 29/262 |
| 2018/0259489 A1 | 9/2018 | Bruch | |
| 2018/0292355 A1 | 10/2018 | Gold | |

OTHER PUBLICATIONS

Wang et al, "Development of Phased Array Ultrasonic Detection System Using a Post-Processing Technique", 2018 IEEE International Conference on Mechatronics and Automation (ICMA), IEEE, Aug. 5, 2018, pp. 1717-1721.

Kim et al., Surface Acoustic Wave Modulation on a Partially Closed Fatigue Crack, The Journal of Acoustical Society of America, vol. 115, No. 5, May 2004, pp. 1961-1972.

R. S. Gilmore et al., "Acoustic microscopy from 10 to 100 MHz for industrial applications," Phil. Trans. Sec. Lond. A 320, 215-235 (1986).

* cited by examiner

ACOUSTIC INSPECTION DEVICE AND METHOD OF OPERATION

PRIORITY INFORMATION

The present application claims priority to U.S. Provisional Patent Application Ser. No. 62/818,229 filed on 14 Mar. 2019, which is incorporated by reference herein.

FIELD

The present disclosure generally relates to systems and methods for inspecting components, or more particularly, to portable acoustic inspection devices and associated methods of operation.

BACKGROUND

Machine components in a variety of industries are frequently inspected for defects or characteristics which may affect performance of the component or machine For example, such characteristic may be used to predict premature component failure, to formulate a maintenance schedule for such components, or to otherwise assess component quality or condition. For example, components in the aviation, automotive, oil and gas, nuclear power generation, and other industries are frequently inspected for faults and imperfections which may result in component and/or system failure if left unrepaired. In addition, particularly when the components are formed from one or more metals, such techniques may be used to assess the crystallographic orientations, grain sizes, or other surface characteristics of the component.

One conventional method of inspecting components includes using a laser to generate energy which excites a surface of a component and obtaining surface wave velocity measurements to inspect the surface of that component. However, such a system requires an optical table setup and a non-portable power source. Thus, use of such a system is limited to analyzing components that are removed from the machine in which they operate and that are of a sufficiently small size to permit mounting on the optical table. Moreover, such systems are complex, expensive, and not suitable for quick and accurate inspection of components, thus reducing their commercial viability in a variety of applications.

Accordingly, an improved inspection device facilitating quick, easy, and accurate component inspection would be useful. More particularly, an acoustic inspection device that provides a cost-effective, accurate, and portable way to inspect components without removing those components from the system in which they operate would be particularly beneficial.

BRIEF DESCRIPTION

Aspects and advantages will be set forth in part in the following description, or may be obvious from the description, or may be learned through practice of the invention.

According to one embodiment of the present subject matter, a portable acoustic inspection device for inspecting a component is provided. The acoustic inspection device includes an acoustic transmitter for generating an acoustic wave that travels along a surface of the component, an acoustic receiver spaced apart from the acoustic transmitter by a transducer gap, the acoustic receiver being configured for receiving the acoustic wave, and a controller in operative communication with the acoustic receiver. The controller is configured for obtaining data indicative of the acoustic wave from the acoustic receiver and determining at least one surface characteristic of the component based at least in part on the data indicative of the acoustic wave.

According to another exemplary embodiment, a method of inspecting a component is provided including directing an acoustic wave along a surface of the component from a first location, receiving the acoustic wave at a second location spaced apart from the first location, and determining at least one surface characteristic of the component based on the received acoustic wave.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
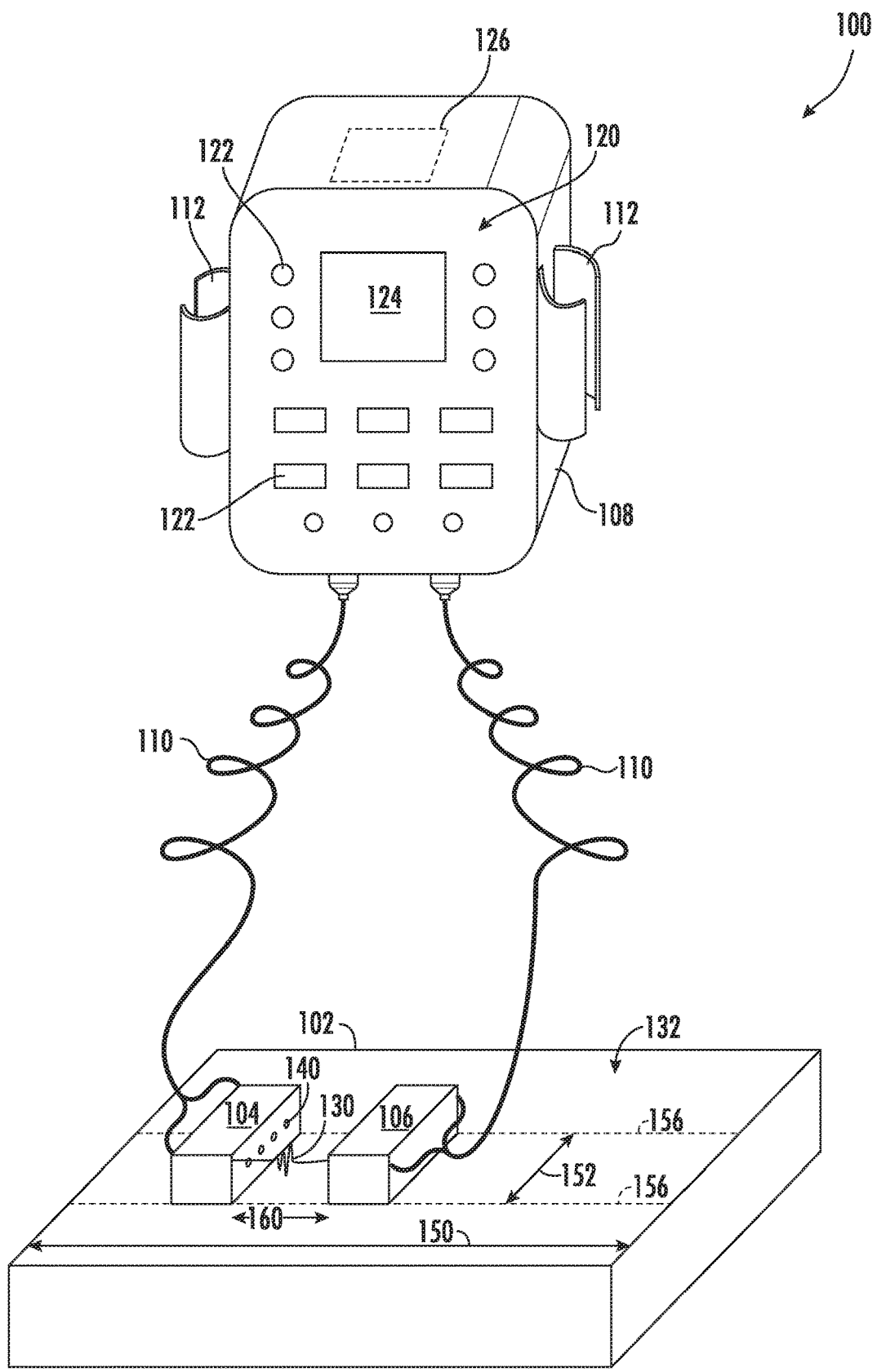
FIG. 1 provides a perspective view of an acoustic inspection device inspecting a component according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. In addition, the terms "upstream" and "downstream" refer to the relative direction with respect to the motion of an object or a flow of a fluid, sound wave, light wave, etc. For example, "upstream" refers to the direction from which the object has moved or fluid has flowed, and "downstream" refers to the direction to which the object is moving or the fluid is flowing. Furthermore, as used herein, terms of approximation, such as "approximately," "substantially," or "about," refer to being within a ten percent margin of error.

The present subject matter is generally directed to an acoustic inspection device and an associated method for inspecting a component. The acoustic inspection device is portable and includes an acoustic transmitter and receiver that may be placed on opposite sides of an inspection region on the surface of the component. The acoustic transmitter has an array of acoustic transducers for generating an acoustic wave that travels along a surface of the component and the acoustic receiver has an array of acoustic transducers for receiving that acoustic wave. A controller determines at least one surface characteristic of the component from the measured acoustic wave, such as its crystalline structure or grain size.

Referring to FIG. 1, an acoustic inspection device 100 that may be used for inspecting a component 102 will be described according to an exemplary embodiment of the present subject matter. As illustrated, acoustic inspection device 100 includes an acoustic transmitter 104 and an acoustic receiver 106 that are connected to a device housing 108 by suitable electrical connectors or wires 110. Device housing 108 may further include mounting clips 112 mounted thereon and being configured for receiving acoustic transmitter 104 and acoustic receiver 106 when not in use, e.g., to facilitate transportation and improve the portability of acoustic inspection device 100. Device housing 108 may generally include any suitable electrical components for facilitating operation of acoustic inspection device 100, as described in detail below.

A user interface panel 120 is located on device housing 108 and may include a variety of user inputs 122 that are generally configured for controlling the operation and inspection process performed by acoustic inspection device 100. Although user inputs 122 are illustrated as push buttons, it should be understood that user inputs 122 and the configuration of acoustic inspection device 100 shown in FIG. 1 is provided by way of example only. More specifically, user interface panel 120 may include various input components, such as one or more of a variety of touch-type controls, electrical, mechanical or electro-mechanical input devices including rotary dials, push buttons, and touch pads. User interface panel 120 may also be provided with one or more graphical display devices or display components 124, such as a digital or analog display device, designed to provide operational feedback or other information to the user.

Generally, acoustic inspection device 100 may include a controller 126 in operative communication with user interface panel 120, acoustic transmitter 104, acoustic receiver 106, or any other suitable components of acoustic inspection device 100. User interface panel 120 of acoustic inspection device 100 may be in communication with controller 126 via, for example, one or more signal lines or shared communication busses, and signals generated in controller 126 operate acoustic inspection device 100 in response to user input via user inputs 122. Input/Output ("I/O") signals may be routed between controller 126 and various operational components of acoustic inspection device 100 such that operation of acoustic inspection device 100 can be regulated by controller 126. In addition, controller 126 may also be in communication with one or more sensors or probes, such as acoustic transmitter 104 and acoustic receiver 106, which may be used to inspect component 102 using acoustic waves and provide inspection data to controller 126 for analysis.

Controller 126 is a "processing device" or "controller" and may be embodied as described herein. Controller 126 may include a memory and one or more microprocessors, microcontrollers, application-specific integrated circuits (ASICS), CPUs or the like, such as general or special purpose microprocessors operable to execute programming instructions or micro-control code associated with operation of acoustic inspection device 100, and controller 126 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 126 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

According to the illustrated embodiment, acoustic inspection device 100 is a handheld, portable unit configured for being easily transported from location to location. In this regard, acoustic inspection device 100 may be carried to a machine (not shown) that contains component 102 to be inspected. Notably, due to the compact size and portability of acoustic inspection device 100, significant machine down time may be reduced as component 102 need not be removed from the machine during inspection. In addition, the size of inspected components may increase as the inspection size is limited only by the length of electrical wires 110 (which may be any suitable length), and the inspection process may be quick, cheap, and accurate.

As shown in FIG. 1, component 102 is a fan disk for a gas turbine engine. However, it should be appreciated that according to alternative embodiments, component 102 may be any suitable part, feature, component, or system components from any suitable machine or device used in any suitable industry. The use of fan disk as component 102 herein is not intended to limit the scope of the present subject matter in any manner. In addition, the particular configuration of acoustic inspection device 100, the packaging of device housing 108, and the types of transmitters and receivers used herein are not intended to limit the scope of the present subject matter. Indeed, it is contemplated that acoustic inspection device 100 may be used to inspect components in the oil and gas industry, the aviation industry, the automotive industry, the amusement park industry, the nuclear power industry, the power generation industry, or any other suitable industry.

In addition, although component 102 is described herein as being formed at least in part from metal, it should be appreciated that acoustic inspection device 100 may be used for inspecting components having any other suitable shape, size, and material, e.g., such as thermoplastics, ceramics, etc. For example, acoustic inspection device 100 may be used to inspect the inner diameter, the outer diameter, or the web of a fan disc, a component flange, a forged disc, a billet of material, a finished part, or any other suitable component having any other suitable size and shape and being formed from any other suitable material.

Figure 2:
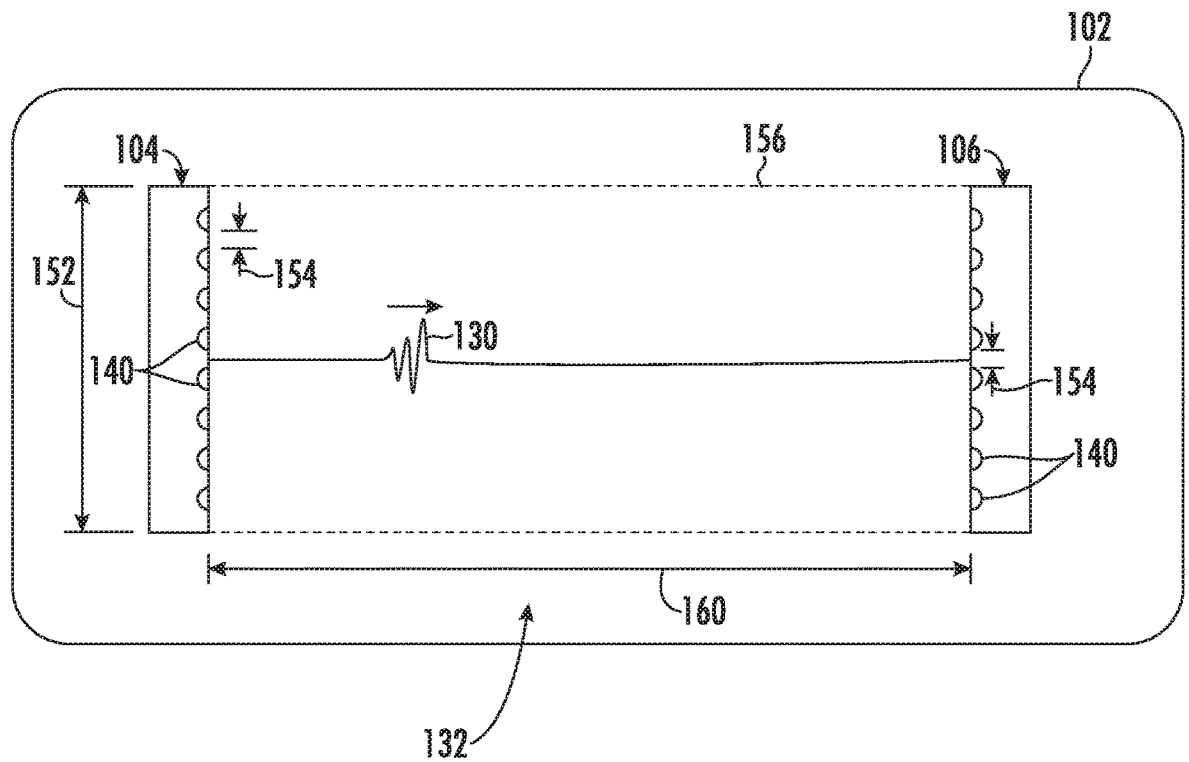
FIG. 2 provides a schematic view of an acoustic transmitter and an acoustic receiver of the exemplary acoustic inspection device of FIG. 1 inspecting a surface of the component according to an exemplary embodiment of the present subject matter.

Referring now also to FIG. 2, the manner in which acoustic inspection device 100 inspects component 102 will be described according to an exemplary embodiment. In general, acoustic inspection device 100 uses acoustic transmitter 104 to transmit or generate an acoustic wave 130 that travels along a surface 132 of component 102. Simultaneously, acoustic inspection device 100 uses acoustic receiver 106 to receive the acoustic wave 130. Specifically, an operator of acoustic inspection device 100 may position acoustic transmitter 104 at one location (i.e., an excitation region) on component 102 while simultaneously positioning acoustic receiver 106 at a second location (i.e., an inspection or interrogation region) spaced apart from acoustic transmitter 104 on surface 132 of component 102.

As used herein, the terms "acoustic transmitter" and "acoustic receiver" are used generally to refer to the sensor, transducer, or device that transmits or generates acoustic wave 130 which interacts with component 102 to facilitate the inspection process. For example, acoustic transmitter 104 may be any suitable device or system for exciting a region of component 102 with an acoustic wave. In this regard, acoustic transmitter 104 may be an excitation source, an energy source, a vibration source, or any other device for generating a vibration, acoustic wave, or surface acoustic wave that may travel through component 102 or along the component surface 132. Similarly, acoustic receiver 106 may be any suitable device or system for receiving, measuring, quantifying, or otherwise detecting such acoustic wave, or more particularly, the acoustic wave response after the acoustic wave has interacted with the surface of component 102.

Thus, acoustic receiver 106 may generally be configured for measuring acoustic wave 130, or the acoustic wave response at one or more locations on surface 132 of component 102. In this regard, for example, the acoustic propagation properties of a region of component 102 may affect the manner in which vibrations or sound waves travel through the material. For example, the material used, the method of formation, the structural configuration, and other factors may affect the acoustic properties of component 102. Acoustic receiver 106 may detect variations such as sound attenuation or velocity to facilitate acoustic inspection and provide useful information regarding component 102. This process of exciting and interrogating, reading, mapping, or otherwise obtaining useful data regarding the acoustic response of component 102 may reveal useful information regarding surface characteristics of component 102.

According to an exemplary embodiment, acoustic transmitter 104 and acoustic receiver 106 comprise an array of acoustic transducers 140. In general, acoustic transducer is any device that converts an electrical signal or control signal into sound waves or that converts a sound wave into an electrical signal. Acoustic transmitter 104 and acoustic receiver 106 may further include any other suitable electronic components for conditioning the sound waves or electrical signals generated, such as amplifiers, conditioning circuits, etc. In addition, it should be appreciated that acoustic transducers as described herein may operate in one or all of a transmit mode, a receiving mode, or a transmit/receive mode such that the same transducers may be used in acoustic transmitter 104 and acoustic receiver 106.

Moreover, it should be appreciated that although acoustic inspection device 100 is described herein as having one acoustic transmitter 104 for transmitting acoustic wave 130 and one acoustic receiver 106 for receiving acoustic wave 130, the scope of the present subject matter is deemed to include any suitable number of transmitters and receivers positioned in any suitable manner for sending and/or receiving acoustic waves or signals. In this regard, controller 126 may operate acoustic receiver 106 as the transmitter and acoustic transmitter 104 as the receiver when desired.

Moreover, controller 126 may be configured to operate the plurality of acoustic transducers 140 within either acoustic transmitter 104 or acoustic receiver 106 in either the acoustic receiving or transmitting mode. In other words, during a single inspection process, acoustic transmitter 104 may be generating acoustic waves 130 at some acoustic transducers 140 while simultaneously receiving acoustic waves 130 at other acoustic transducers 140. The operation of acoustic inspection device 100 described herein is not intended to be limiting. For example, although acoustic transmitter 104 and acoustic receiver 106 are described herein as including an array of acoustic transducers 140, it should be appreciated that these devices may include as few as one acoustic transducer 140 each while remaining within the scope of the present subject matter.

In addition, according to exemplary embodiments, controller 126 may be configured for operating acoustic transmitter 104 and acoustic receiver 106 to achieve a full matrix capture (FMC) of acoustic waves 130 generated by acoustic inspection device 100. As used herein, the term "full matrix capture" (FMC) and the like is intended to refer to a data acquisition strategy that provides for every transmitter and receiver to communicate acoustic data therebetween. In this manner, full matrix capture enables the capture of every possible transmit-receive combination for a given ultrasonic or acoustic transducer. Full matrix capture may thus increase the reliability of ultrasonic inspection, provide higher resolution images or data to facilitate improved analysis, and enable cost effective detection of component microstructures, surface textures, grain sizes and orientations, etc.

Figure 3:
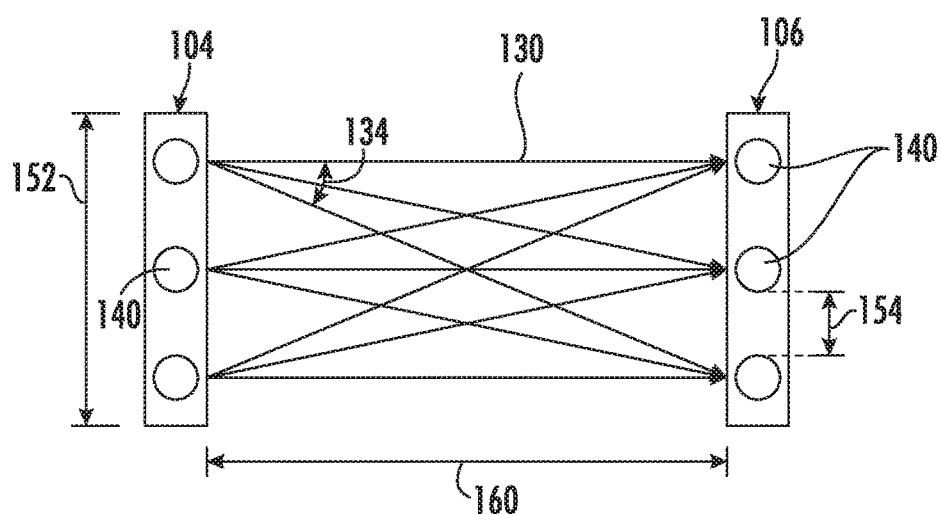
FIG. 3 provides a schematic view of a plurality of acoustic transducers transmitting acoustic waves according to an exemplary embodiment of the present subject matter.

An exemplary illustration of the operation of the full matrix capture is illustrated in FIG. 3, which illustrates each acoustic transducer 140 in acoustic transmitter 104 as transmitting an acoustic wave 130 to each of acoustic transducers 140 within acoustic receiver 106. Although only three acoustic transducers 140 are illustrated herein, it should be appreciated that acoustic transmitter 104 and acoustic receiver 106 may include any suitable number, position, configuration, and operating mode of acoustic transducers 140 according to alternative embodiments.

Referring again to FIG. 2, during an inspection process, acoustic receiver 106 may be spaced apart from acoustic transmitter 104 by a transducer gap 160. For example, according to the illustrated embodiment, transducer gap 160 is approximately 0.15 inch. However, according to alternative embodiments, transducer gap 160 may be between about 0.05 and 1 inch, between about 0.1 and 0.25 inch, or any other suitable distance for facilitating the acoustic inspection process.

In addition, acoustic transmitter 104 and acoustic receiver 106 may include a plurality of acoustic transducers 140 spaced apart along a substantially straight line to define a scan width 152. Notably, according to an exemplary embodiment, the plurality of acoustic transducers 140 are spaced apart from each other by a transducer gap or spacing 154. The transducer spacing 154 may be selected such that the plurality of acoustic transducers 140 inspect strips of surface 132 of component 102. While moving acoustic transmitter 104 and acoustic receiver 106 in tandem across a scan length 150 to be inspected, the scan length 150 can be subdivided into measured increments by use of a positional encoding device. These strips of data can be combined using the encoding device and transducer positional information to form a complete picture of surface 132.

More specifically, when acoustic transmitter 104 and acoustic receiver 106 are translated in tandem across the surface of component 102, controller 126 may obtain a two-dimensional image (e.g., as indicated by dotted lines 156 in FIG. 2) of surface 132. Thus, a two-dimensional image 156 may map a section of surface 132 and have the dimensions of the scan length 150 by the scan width 152. An operator may continuously reposition acoustic transmitter 104 and acoustic receiver 106 to obtain plurality of images of surface 132, which controller 126 may stitch together to form an overall image of surface 132 of component 102, which may be used to detect component characteristics, defects, faults, etc.

Notably, the scan length 150, scan width 152, and transducer spacings 154 may vary depending on the specific configuration of acoustic inspection device 100, the types of transducers used, the components being inspected, or any other suitable factors or applications. For example, according to the illustrated embodiment, scan length 150 is approximately 20 inches. However, according to alternative embodiments, scan length 150 may be between about 0.5 and 50 inches, between about 5 and 40 inches, between about 10 and 30 inches, or any other suitable distance for facilitating the acoustic inspection process.

For example, according to an exemplary embodiment, each of acoustic transmitter 104 and acoustic receiver 106 may have an array of between about four and 256 acoustic transducers 140, and the acoustic transmitter 104 may have a number of acoustic transducers 140 similar to or different than the acoustic receiver 106. According to other embodiments, each of acoustic transmitter 104 and acoustic receiver 106 may include between about 16 and 128 acoustic transducers, between about 40 and 80 acoustic transducers, or about 64 acoustic transducers. In addition, it should be appreciated that acoustic transducers 140, although illustrated as aligned along a straight line, could be stacked in multiple rows, or could be positioned in any other suitable manner within acoustic transmitter 104 and acoustic receiver 106.

For example, according to the illustrated embodiment, the transducer spacing 154 may be between about 0.005 and 0.5 inch, between about 0.01 and 0.02 inch, or about 0.016 inch. However, transducer spacing 154 may generally be selected to correspond with a sound steering angle 134 of acoustic wave 130 transmitted from each acoustic transducer 140.

Notably, acoustic transmitter 104 and acoustic receiver 106 may generate and receive acoustic waves of any suitable amplitude, wavelength, and frequency suitable for measuring component 102 for the desired surface characteristics. In this regard, for example, acoustic wave 130 may have a frequency of between about 0.1 and 80 MHz. According to alternative embodiments, acoustic wave 130 may have a frequency of between about 0.5 and 20 MHz, or about 10 MHz. However, it should be appreciated that any other suitable frequency may be used and acoustic wave 130 may be tailored to detect certain defects, surface quality characteristics, etc.

As used herein, the term "surface characteristic" and the like are intended to refer to qualitative characteristics, quantitatively measured features, or other properties of component 102, or more specifically, surface 132 of component 102. For example, the surface characteristics measured by acoustic inspection device 100 may include microtexture, surface roughness, cracks, micro-fractures, surface defects, or other surface aberrations or features. In addition, particularly when component 102 is formed from a metal, the surface characteristic may include information related to the crystalline structure of surface 132, to the crystal/grain orientation (e.g., such as microtexture), to the grain size, to the grain shape (e.g., such as honeycomb), or to any other metallurgical surface quality characteristic. In addition, controller 126 may be configured for calculating statistics of surface quality characteristics, such as the standard deviation of sound attenuation or velocity, whereby controller 126 analyzes a digital 2-D image 156 defined by scan length 150 and scan width 152, and calculates statistics of some or all measured signals within that area to predict, measure, estimate, or otherwise obtain an average grain characteristic.

Now that the construction and configuration of acoustic inspection device 100 has been described according to exemplary embodiments of the present subject matter, an exemplary method 200 for inspecting a component will be described according to an exemplary embodiment of the present subject matter. Method 200 can be used to inspect component 102 using acoustic inspection device 100, or may be used to inspect any other suitable component using any other suitable inspection system. In this regard, for example, controller 126 may be configured for implementing some or all steps of method 200. Further, it should be appreciated that the exemplary method 200 is discussed herein only to describe exemplary aspects of the present subject matter, and is not intended to be limiting.

Figure 4:
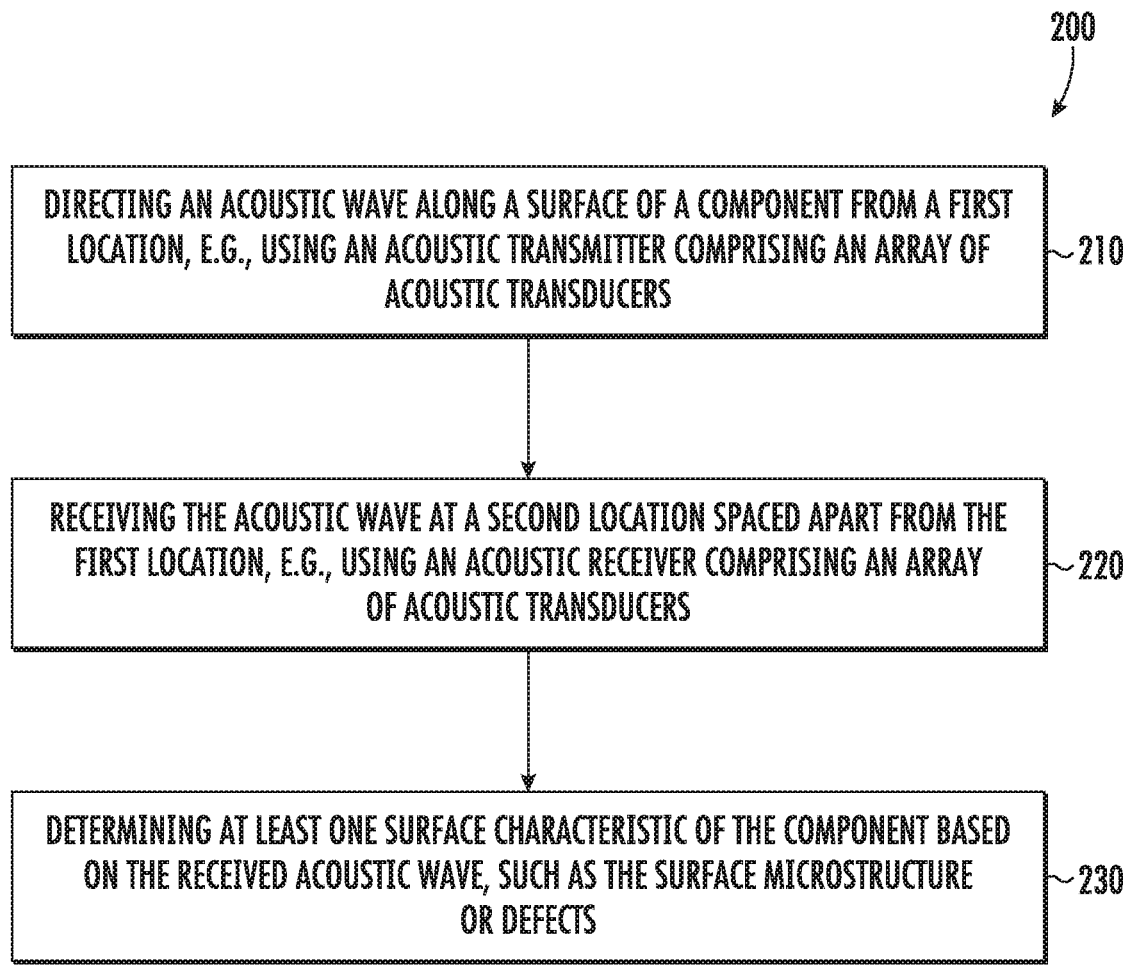
FIG. 4 provides a method of inspecting a component according to an exemplary embodiment of the present subject matter.

Referring now to FIG. 4, method 200 includes, at step 210, directing an acoustic wave along a surface of a component from a first location. Specifically, continuing the example from above, controller 126 may use acoustic transmitter 104 to transmit a plurality of acoustic waves from a plurality of acoustic transducers 140 across surface 132 of component 102. As illustrated, the plurality of transducers 140 in acoustic transmitter 104 may be oriented in an array substantially along a straight line, such that they define a scan width 152.

Step 220 includes receiving the acoustic wave at a second location spaced apart from the first location. For example, controller 126 may obtain data indicative of acoustic wave 130 from acoustic receiver 106. Notably, according the illustrated embodiment, acoustic receiver 106 includes the same number and spacing of acoustic transducers 140 but which are spaced apart from acoustic transducers 140 in acoustic transmitter 104 by transducer gap 160. Thus, controller 126 may obtain a two-dimensional image 156 of surface 132. As explained above, controller 126 may use such a two-dimensional image 156 to determine surface characteristics of component 102. In addition, an operator may sequentially move acoustic transmitter 104 and acoustic receiver 106 in tandem around a surface 132 of component 102 to obtain a total surface image of the entire component 102.

Step 230 includes determining at least one surface characteristic of the component based on the received acoustic wave. For example, as explained above, the acoustic wave may be used by controller 126 to determine surface microstructure, such as crystalline structure and/or grain size. In addition, the surface characteristic may be related to microtexture, surface roughness, component cracks or defects which may result in failure, or any other suitable acoustically detectable feature within surface 132 of component 102.

FIG. 4 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using acoustic inspection device 100 as an example, it should be appreciated that these methods may be applied to inspecting components using any suitable acoustic monitoring device.

Further aspects of the invention are provided by the subject matter of the following clauses:

1. A portable acoustic inspection device for inspecting a component, the acoustic inspection device comprising: an acoustic transmitter for generating an acoustic wave that travels along a surface of the component; an acoustic receiver spaced apart from the acoustic transmitter by a transducer gap, the acoustic receiver being configured for receiving the acoustic wave; and a controller in operative communication with the acoustic receiver, the controller being configured for: obtaining data indicative of the acoustic wave from the acoustic receiver; and determining at least one surface characteristic of the component based at least in part on the data indicative of the acoustic wave.

2. The acoustic inspection device of any preceding clause, wherein the acoustic transmitter and the acoustic receiver are each acoustic transducers that are operable in a transmitting mode and a receiving mode.

3. The acoustic inspection device of any preceding clause, wherein at least one of the acoustic transmitter or the acoustic receiver comprises: a plurality of acoustic transducers, each of the plurality of transducers being spaced apart from one another by a transducer spacing.

4. The acoustic inspection device of any preceding clause, wherein the plurality of acoustic transducers comprises between about 20 and 100 transducers positioned along a substantially straight line.

5. The acoustic inspection device of any preceding clause, wherein the transducer spacing is between about 0.05 and 0.15 inches.

6. The acoustic inspection device of any preceding clause, wherein the controller is configured for acquiring a full matrix capture of a plurality of acoustic waves generated by the plurality of acoustic transducers.

7. The acoustic inspection device of any preceding clause, wherein the acoustic transmitter has a scan width of between about 0.5 to 2 inches.

8. The acoustic inspection device of any preceding clause, wherein the data indicative of the acoustic wave forms a two-dimensional image of the surface of the component.

9. The acoustic inspection device of any preceding clause, wherein scan length of the acoustic transmitter and the acoustic receiver is between about 5 and 40 inches.

10. The acoustic inspection device of any preceding clause, wherein the acoustic wave has a frequency of between about 0.5 and 20 MHz.

11. The acoustic inspection device of any preceding clause, wherein the acoustic wave has a frequency of about 10 MHz.

12. The acoustic inspection device of any preceding clause, wherein the at least one surface characteristic comprises a crystalline structure or an average grain size of the surface of the component.

13. The acoustic inspection device of any preceding clause, wherein the acoustic transmitter, the acoustic receiver, and the controller are stored in a portable device.

14. The acoustic inspection device of any preceding clause, wherein the component is metal.

15. A method of inspecting a component, the method comprising: directing an acoustic wave along a surface of the component from a first location; receiving the acoustic wave at a second location spaced apart from the first location; and determining at least one surface characteristic of the component based on the received acoustic wave.

16. The method of any preceding clause, wherein directing an acoustic wave comprises: generating a plurality of acoustic waves from a plurality of acoustic transducers, wherein each of the plurality of transducers are spaced apart from one another by a transducer spacing.

17. The method of any preceding clause, further comprising: acquiring a full matrix capture of the plurality of acoustic waves generated by the plurality of acoustic transducers.

18. The method of any preceding clause, further comprising: forming a two-dimensional image of the surface of the component from the received acoustic wave.

19. The method of any preceding clause, wherein the acoustic wave has a frequency of between about 0.5 and 20 MHz.

20. The method of any preceding clause, wherein determining the at least one surface characteristic comprises: determining a crystalline structure or an average grain size of the surface of the component.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A portable acoustic inspection device for inspecting a component, the acoustic inspection device comprising:
    a plurality of acoustic transmitters for generating surface acoustic waves that travel along a surface of the component;
    a plurality of acoustic receivers aligned opposite from the acoustic transmitters by a transducer gap, the acoustic receivers being configured for receiving the surface acoustic waves; and
    a controller in operative communication with the acoustic receivers, the controller being configured for:
        obtaining data indicative of the surface acoustic waves from the acoustic receivers; and
        determining at least one surface characteristic of the component based at least in part on the data indicative of the surface acoustic waves.

2. The portable acoustic inspection device of claim 1, wherein the acoustic transmitters and the acoustic receivers are acoustic transducers that are operable in a transmitting mode and a receiving mode.

3. The portable acoustic inspection device of claim 2, wherein acoustic transducers are spaced apart from one another by a transducer spacing.

4. The portable acoustic inspection device of claim 2, wherein the plurality of acoustic transducers comprises between about 20 and 100 transducers positioned along a substantially straight line.

5. The portable acoustic inspection device of claim 2, wherein the transducer spacing is between about 0.05 and 0.15 inches.

6. The portable acoustic inspection device of claim 2, wherein the controller is configured for acquiring a full matrix capture of the surface acoustic waves generated by the plurality of acoustic transducers.

7. The portable acoustic inspection device of claim 1, wherein the acoustic transmitters are aligned to have a scan width of between about 0.5 to 2 inches.

8. The portable acoustic inspection device of claim 1, wherein the data indicative of the surface acoustic waves form a two-dimensional image of the surface of the component.

9. The portable acoustic inspection device of claim 1, wherein the acoustic transmitters and the acoustic receivers are movable in tandem along a scan length between about 5 and 40 inches.

10. The portable acoustic inspection device of claim 1, wherein the surface acoustic waves have a frequency of between about 0.5 and 20 MHz.

11. The portable acoustic inspection device of claim 1, wherein the at least one surface characteristic comprises a crystalline structure or an average grain size of the surface of the component.

12. The portable acoustic inspection device of claim 1, further comprising a portable housing having the controller stored therein, the portable housing having a mount configured to receive at least one of the acoustic transmitters and the acoustic receivers.

13. The portable acoustic inspection device of claim 1, wherein the acoustic transmitters transmit the surface acoustic waves generally parallel to the surface of the component.

14. A method of inspecting a component, the method comprising:

at a plurality of acoustic transmitters, directing surface acoustic waves along a surface of the component from a first location;

at a plurality of acoustic receivers aligned opposite the plurality of acoustic transmitters, receiving the surface acoustic waves at a second location spaced apart from the first location; and determining at least one surface characteristic of the component based on the received surface acoustic waves.

15. The method of claim 14, wherein the acoustic transmitters and the acoustic receivers are acoustic transducers, wherein the acoustic transducers are spaced apart from one another by a transducer spacing.

16. The method of claim 15, further comprising:

acquiring a full matrix capture of the plurality of surface acoustic waves generated by the acoustic transducers.

17. The method of claim 14, further comprising:

forming a two-dimensional image of the surface of the component from the received surface acoustic waves.

18. The method of claim 14, wherein determining the at least one surface characteristic comprises:

determining a crystalline structure of the surface of the component.

19. The method of claim 14, further comprising:

moving the acoustic transmitters and acoustic receivers in tandem along a scan length between about 5 and 40 inches.

* * * * *